United States Patent
Park

(10) Patent No.: US 8,874,927 B2
(45) Date of Patent: Oct. 28, 2014

(54) APPLICATION EXECUTION SYSTEM AND METHOD OF TERMINAL

(71) Applicant: Samsung Electronics Co. Ltd., Suwon-si (KR)

(72) Inventor: Sunghyun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 13/661,383

(22) Filed: Oct. 26, 2012

(65) Prior Publication Data

US 2013/0124871 A1 May 16, 2013

(30) Foreign Application Priority Data

Nov. 15, 2011 (KR) .................. 10-2011-0118792

(51) Int. Cl.
*G06F 21/00* (2013.01)
*G06F 11/30* (2006.01)
*G06F 21/64* (2013.01)

(52) U.S. Cl.
CPC .................................. *G06F 21/645* (2013.01)
USPC .......................................... 713/187; 726/25

(58) Field of Classification Search
USPC ........................................................ 713/187
See application file for complete search history.

(56) References Cited

U.S. PATENT DOCUMENTS

| 2008/0127167 A1* | 5/2008 | Elliott ........................... 717/174 |
| 2010/0169654 A1* | 7/2010 | Kiel et al. ..................... 713/176 |
| 2011/0238716 A1* | 9/2011 | Amir et al. .................... 707/823 |

OTHER PUBLICATIONS

Selwyn Russell;Using Public Domain MultiPrecision Arithmetic Packages for Computer Security Software Applications On a Personal Computer; Mar. 1992; ACM; p. 9-12.*

* cited by examiner

*Primary Examiner* — Mohammad W Reza
*Assistant Examiner* — Monjour Rahim
(74) *Attorney, Agent, or Firm* — Jefferson IP Law, LLP

(57) ABSTRACT

An application execution system and a method for executing applications, at a terminal, with security check on the application package are provided. The system includes an application creator including an enabler, for creating an application package including a plurality of binary codes and content files, and for adding a checksum file generated by ciphering, at the enabler, information on a main binary of the application package, and a terminal storing the application, for determining a validity of the application package, and for executing an application according to the validity of the application package, and a subsystem including a checker, for ciphering the main binary of the application package using the checker added to the open function in response to the call, for notifying, when the result of the ciphering and the checksum file match with each other, the operating system of the successful validation.

8 Claims, 4 Drawing Sheets

APPLICATION EXECUTION SYSTEM AND METHOD OF TERMINAL

PRIORITY

This application claims the benefit under 35 U.S.C. §119 (a) of a Korean patent application filed on Nov. 15, 2011 in the Korean Intellectual Property Office and assigned Serial No. 10-2011-0118792, the entire disclosure of which is hereby incorporated by reference.

BACKGROUND OF THE INVENTION

1. Field of the Invention

The present invention relates to an application execution system and method of a terminal More particularly, the present invention relates to a system and method for executing applications, at a terminal, with security check on the application package.

2. Description of the Related Art

Typically, the execution binary (e.g., exe/dll for Windows and bin for Android) of a mobile application is provided with certification information at its end such that the operating system of the terminal verifies the application with the certification information. For example, in case of the Windows operating system, this method supports only one certification, and the Original Equipment Manufacturer (OEM) or a 3rd party may not control the certification. In this case, although it is necessary for the OEM or 3rd party to configure access restriction to a driver or service module providing a certain supplementary function, there is no way to make this possible.

Therefore, a need exists for a system and method for an application execution method that enable a terminal to execute the application after checking the checksum file of an application package.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an application execution method that enable a terminal to execute the application after checking the checksum file of an application package. This method facilitates the OEM or 3rd party to control the application added to the platform on the subsystem of the terminal.

In accordance with an aspect of the present invention, an application execution system is provided. The system includes an application creator including an enabler, for creating an application package including a plurality of binary codes and content files, and for adding a checksum file generated by ciphering, at the enabler, information on a main binary of the application package, and a terminal storing the application, for determining, when a request for executing the application is detected, a validity of the application package, and for executing an application according to the validity of the application package, wherein the terminal includes an operating system for calling an open function of a subsystem in response to an application execution request and for determining whether to allow the application to use the subsystem depending on the validity of the application package, and a subsystem including a checker, for ciphering the main binary of the application package using the checker added to the open function in response to the call, for notifying, when the result of the ciphering and the checksum file match with each other, the operating system of the successful validation, the enabler and the checker use the same ciphering key.

In accordance with another aspect of the present invention, an application execution method is provided. The method includes creating, at an application creator, an application package including a plurality of binary codes and content files; inserting a checksum file generated by ciphering information on a main binary of the application package into the application package, storing, at a terminal, the application package, determining, when a request for executing the application is detected, a validity of the application package, and executing an application according to the validity of the application package, wherein the executing of the application includes calling, at an operating system, an open function of a subsystem in response to an application execution request, ciphering the main binary of the application package using a checker added to the open function in response to the calling of the open function, notifying, when the result of the ciphering and the checksum file match with each other, the operating system of the successful validation, and permitting, when the validation is success, the application to use the subsystem, the enabler and the checker using the same ciphering key.

In accordance with another aspect of the present invention, an application execution method is provided. The method includes receiving a request for executing an application included in an application package, determining a validity of the application package, and executing the application according to the validity of the application package, wherein the determining of the validity of the application package includes calling, at an operating system, an open function of a subsystem in response to an application execution request, ciphering a main binary of the application package using a checker added to the open function in response to the calling of the open function, and comparing the ciphered value with a checksum file included in the application package.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
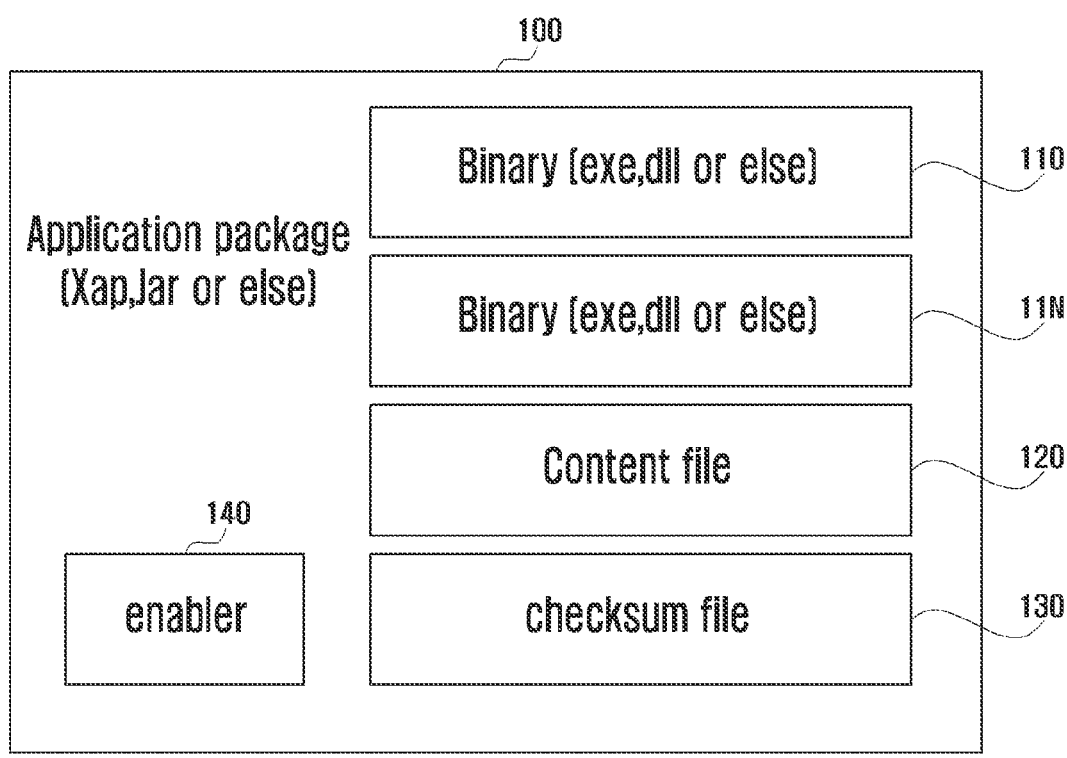
FIG. 1 is a block diagram illustrating a configuration of an application package generator according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is made with reference to numerous specific details such as application to provide a thorough understanding of exemplary embodiments of the present invention, those skilled in the art will appreciate that the present invention can be practiced without some or all of these specific details. Detailed description of well-known functions and structures incorporated herein may be omitted to avoid obscuring the subject matter of the present invention.

In a portable terminal, a program update and a functional supplement take place frequently. In order to support a program update, an application installed in the portable terminal has to be designed updatable. An exemplary embodiment of the present invention proposes a method for controlling the usage right of a system resource in such a way that the application inserts a checksum file into an application package (e.g., xap, jar, and jav/.net model mainly using sandbox or intermediate language) rather than into a binary type (e.g., exe or execution binary) such that the terminal verifies the checksum file in execution of the application.

A description is first made of the method for creating an application package according to an exemplary embodiment of the present invention. When the terminal manufacturer, OEM, and/or 3rd party (hereinafter, referred to as application creator) creates an application for use in a terminal, the application creates the binary codes for executing the application in unit of file. The application creator also packs the created files and contents into a package (e.g., an application package). When generating the application package, an enabler of the application creator generates a checksum file using a main binary (e.g., an application execution file) of the application and includes the checksum file in the application package. The checksum file is created by ciphering the name of the main binary, file size, program ID, and the like with a ciphering key using a hash function.

Second, a description is made of the method for executing the application according to an exemplary embodiment of the present invention. The terminal may download the application package created as described above, store the downloaded application package in its memory, and execute the stored application package. When executing the application, the terminal ciphers binary code of the application by means of a checker, compares the ciphered value with the checksum file included in the application package, and executes the application when ciphered value matches the checksum file.

In this manner, the application created by the terminal manufacturer, OEM, and/or 3rd party can be received and executed by the terminal. For example, the terminal is allowed to control the application added to the platform by the OEM and 3rd party on its subsystem. Here, the subsystem may be any of a driver or a service running on the terminal. The driver may be any of a camera driver, a display driver, and the like, and the service may be a GPS-based location service, or the like.

Here, the checksum file corresponds to a file including the checksum value obtained by determining the profile of the execution module of the application package. The enabler is a program which creates the checksum and includes in the package. The checker is a module which determines whether the application package using the subsystem of the terminal includes a checksum file and, if so, verifies the value of the checksum file.

According to an exemplary embodiment of the present invention, if the application package is executed, the terminal approaches the subsystem defined by the OEM/3rd party. Afterward, the subsystem checks (e.g., analyzes) the application information to verify the validity of the package and, if the package is verified (i.e., match with the checksum file included in the application package), the terminal allows the application to use the subsystem.

FIG. 1 is a block diagram illustrating a configuration of an application package generator according to an exemplary embodiment of the present invention.

Referring to FIG. 1, the application package includes a plurality of binary codes 110 and 11N, and a content file 120 including images necessary for execution the corresponding application. The application package generator 100 includes an enabler 140 which generates the checksum file 130 using the main binary included in the application package and includes the checksum file 130 into the application package. The enabler 140 generates the checksum file by ciphering the name of the main binary, file size, and program ID using the same ciphering key used by the checker of the terminal.

The application package including the checksum file is generated as shown in FIG. 1. The terminal user may download and store the application package in the memory of the terminal.

Figure 2:
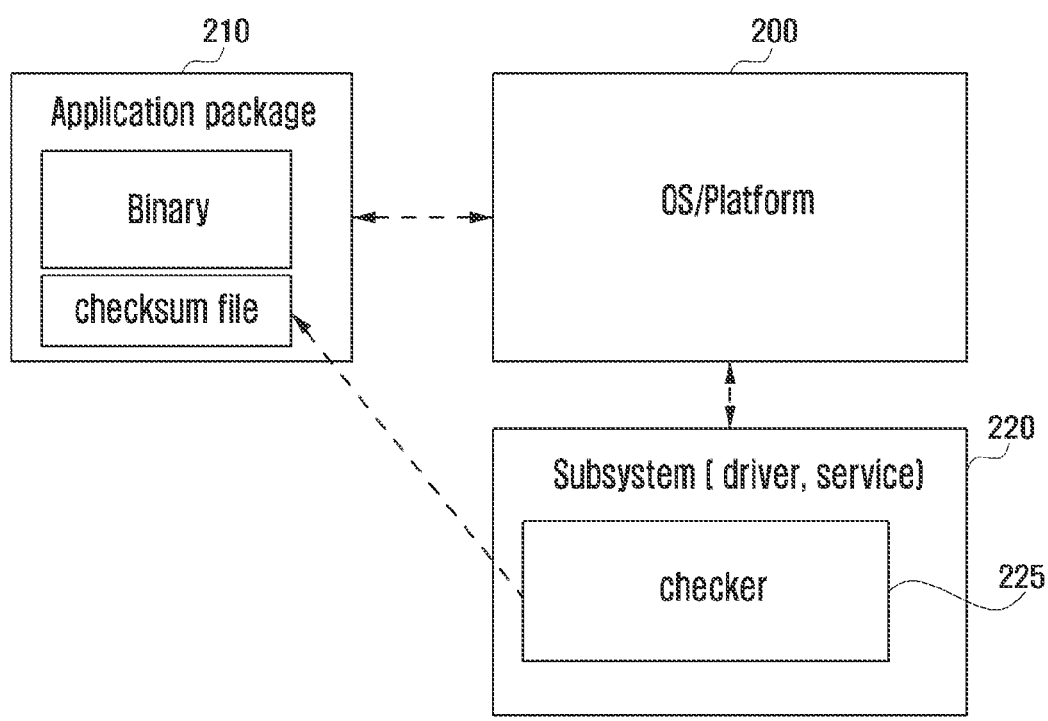
FIG. 2 is a block diagram illustrating a configuration of a terminal for executing an application package according to an exemplary embodiment of the present invention.

FIG. 2 is a block diagram illustrating a configuration of a terminal for executing an application package according to an exemplary embodiment of the present invention.

Referring to FIG. 2, if the user requests execution of the application 210, the operating system 200 calls the subsystem 220 to execute the application. At this time, the subsystem 220 calls an open function. The subsystem 220 is provided with an application execution open function, an application execution close function, a read function of execution a function of the application, and a write function. According to an exemplary embodiment of the present invention, a checker 225 as an inspection module for validating the execution of the corresponding application is added to the open function. At this time, the checker 225 retrieves the main binary of the application 210 and generates a checksum file by ciphering the name, file size, and ID of the retrieved main binary. The ciphering key of the checker 225 is identical with the ciphering key used by the enabler 140 of the application generator 100 of FIG. 1.

Afterward, the subsystem 220 compares the output of the checker 225 with the checksum file of the application package and notifies the operating system 200 of the comparison result. If the two values match with each other, the operating system controls such that the application 210 uses the subsystem 220 and, otherwise, controls such that the application 210 cannot use the subsystem 220. Here, the subsystem 220 may be a driver or a service module for executing the application 210 as described above.

Figure 3:
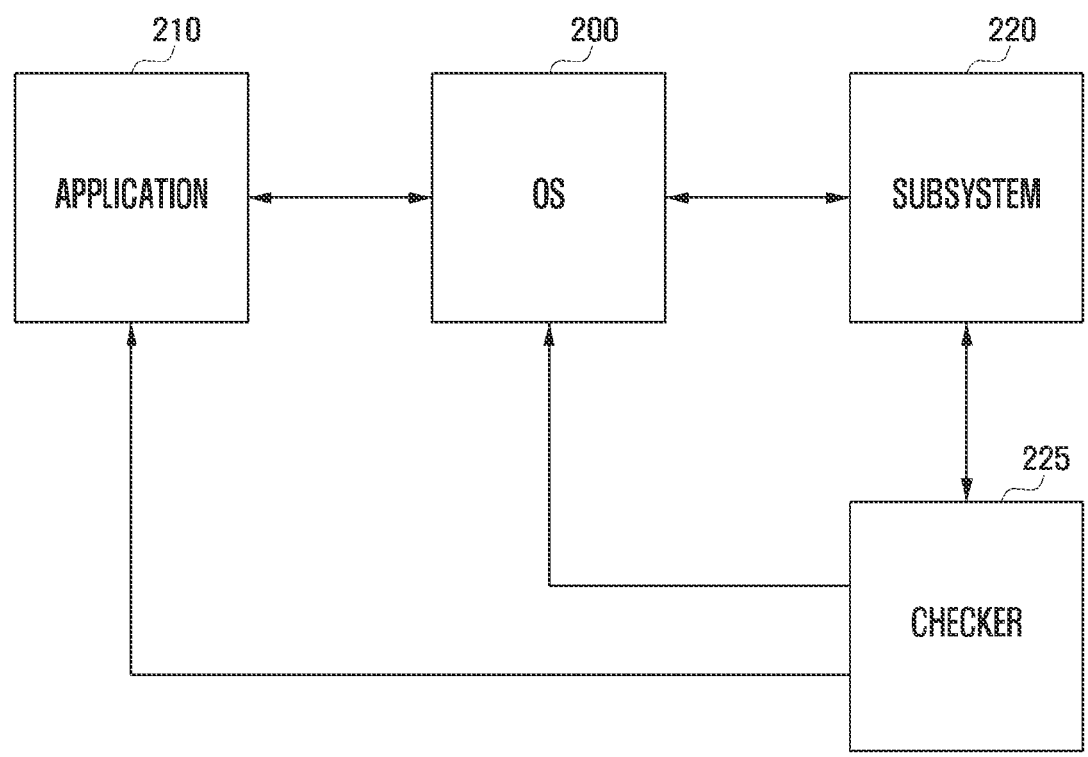
FIG. 3 is a block diagram illustrating a configuration of a terminal according to an exemplary embodiment of the present invention.

FIG. 3 is a block diagram illustrating a configuration of a terminal according to an exemplary embodiment of the present invention.

Referring to FIG. 3, if the user requests for execution of a certain application, the operating system 200 operates the main binary of the application 210. The application 210 requests for use of the subsystem 220, and the operating system 200 calls the open function of the subsystem 220 in response to the request. Here, the open function includes the includes the checker 225, which checks the main binary of the application 210 and ciphers the information (e.g., name, file size, ID, etc.) of the main binary. The main binary of the application package may be the execution file having the same name as the application package and include the main binary name in the application package information.

The checker 225 determines whether the application package using the subsystem 220 includes a checksum file and, if so, compares the generated cipher value with the checksum file value included in the application package to determine whether the two values match with each other. The checker 225 sends the comparison result to the subsystem 220, and the subsystem 220 notifies the operating system 200 of the authentication check result (i.e., failure or success). The operating system 200 may allow or reject the application 210 to use the subsystem 220 depending on the authentication check result.

Figure 4:
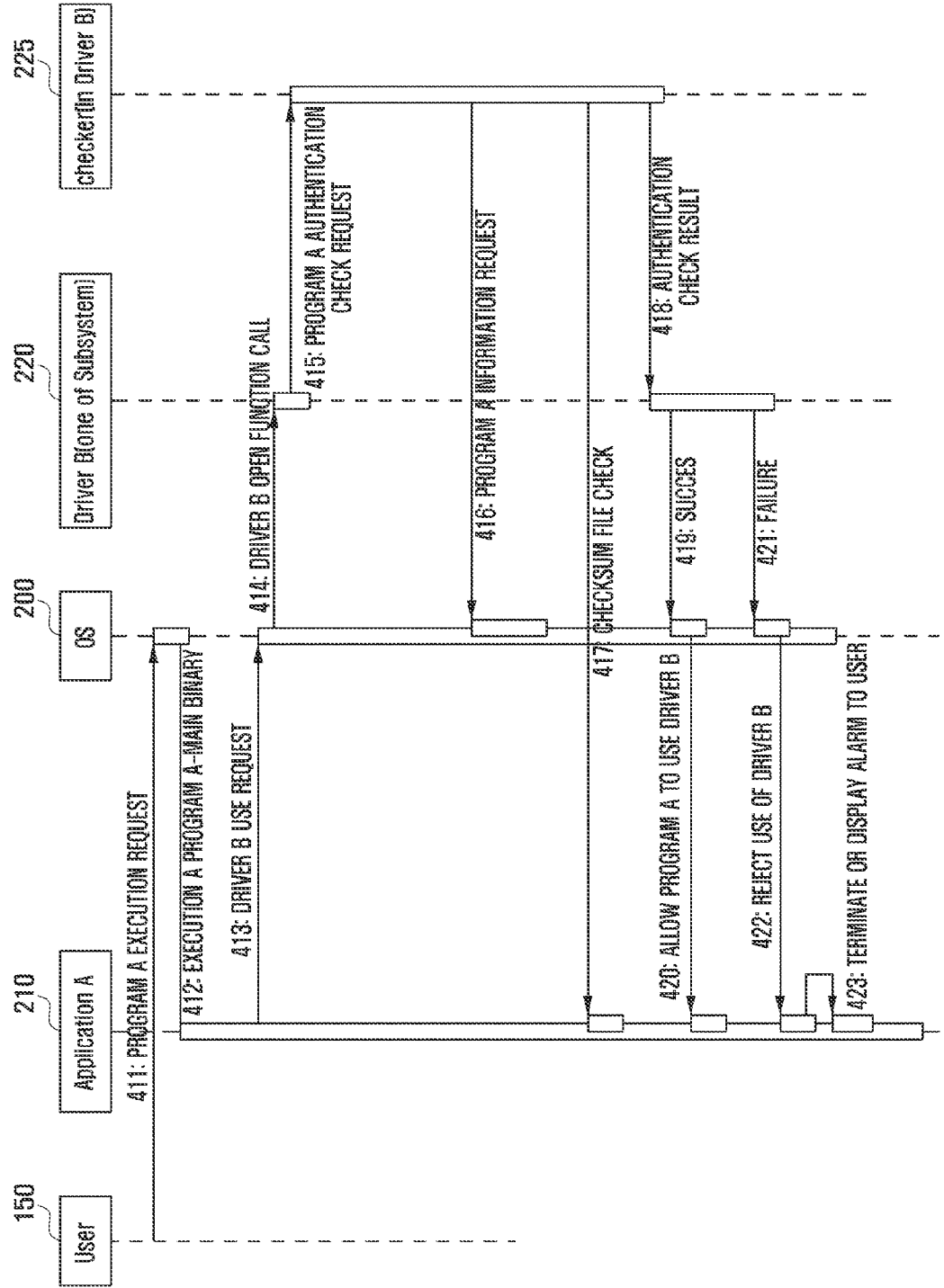
FIG. 4 is a signaling diagram illustrating an application execution procedure of a terminal according to an exemplary embodiment of the present invention.

FIG. 4 is a signaling diagram illustrating an application execution procedure of a terminal according to an exemplary embodiment of the present invention.

Referring to FIG. 4, the application A 210 may be structured in the form of the application package including the checksum file generated by the enabler as shown in FIG. 1. The enabler generates the checksum file using the same ciphering key as the checker 225. The application package may be created by a third party as aforementioned and downloaded to be stored in the terminal For example, the terminal may receive and store the application created by an OEM or a third party to support supplementary function through download process.

If the user 150 requests for execution of the application A 210 at step 411, the operating system 200 detects the program A execution request and drives the main binary file of the application A at step 412. The application A 210 requests the operating system 200 for the use of the subsystem to execute the application at step 413. As an example, it is assumed that the subsystem is the driver B 220.

In response to the request, the operating system 200 calls the open function of the driver B 220 at step 414. Here, the open function is added to the checker 225 as the inspection module for inspecting the application A. At step 415, the driver B 220 requests the checker 225 to check the authentication of the application A which has requested for use of the driver B 220. At step 416, the checker 225 requests the operating system 200 for the information on the application A 210 and ciphers the name, size, and ID of the main binary of the application A. For example, the checker 225 determines whether the ciphering key is identical with that used for creating the checksum included in the application A 210. Afterward, the checker 225 compares the checksum file value of the application A 210 with the authentication test value created by the checks to verify the authentication at step 417 and notifies the driver B 220 of the verification result at step 418. The driver B 220 notifies the operating system 200 of the verification result of success at step 419 or failure at step 421. If the verification result is a success, then the operating system 200 controls to allow the application A 210 to use the driver B 220 at step 420 and, otherwise if the verification result is failure, the operating system 200 controls to reject the use of the driver B 220 at step 422. If the operating system 200 controls to reject the application A 210 from using the driver B 220 at step 220, the terminal terminates the application A or displays a notification message alarming the user that the application A rejected to use the driver B 220 at step 423.

As described above, the application execution system and method of exemplary embodiments of the present invention allows an OEM or 3rd party to add a checksum file to an application package such that the terminal accesses the subsystem defined by the OEM or 3rd party to check the application information and inspect the validity of the application information and such that the terminal grants usage right when the validity of the application is verified. The OEM or 3rd party may create an application of which functionality is extensible with the access right to a driver or service module. Accordingly, the application execution system and method is capable of improving the security and management efficiency of the subsystem provided by the OED or 3rd party.

The software (e.g., the application) may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

As a non-exhaustive illustration only, a terminal described herein may refer to mobile devices such as a cellular phone, a Personal Digital Assistant (PDA), a digital camera, a portable game console, and an MP3 player, a Portable/Personal Multimedia Player (PMP), a handheld e-book, a portable lap-top PC, a tablet PC, a Global Positioning System (GPS) navigation, and devices such as a desktop PC, a High Definition Television (HDTV), an optical disc player, a setup box, and the like capable of wireless communication or network communication consistent with that disclosed herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An application execution system, the system comprising:
   an application creator including an enabler, for creating an application package including a plurality of binary codes and content files, and for adding a checksum file generated by ciphering, at the enabler, information on a main binary of the application package; and
   a terminal storing the application, for determining, when a request for executing the application is detected, a validity of the application package, and for executing an application according to the validity of the application package,
   wherein the terminal comprises:
   an operating system for calling an open function of a subsystem in response to an application execution request and for determining whether to allow the application to use the subsystem depending on the validity of the application package; and
   a subsystem including a checker, for ciphering the main binary of the application package using the checker added to the open function in response to the call, for notifying, when the result of the ciphering and the checksum file match with each other, the operating system of the successful validation, the enabler and the checker using the same ciphering key.

2. The system of claim 1, wherein the enabler and the checker cipher a name, file size, and program ID of the main binary.

3. The system of claim 2, wherein the subsystem is one of a driver and a service which the application has requested for use.

4. An application execution method, the method comprising:
   creating, at an application creator, an application package including a plurality of binary codes and content files;
   inserting a checksum file generated by ciphering information on a main binary of the application package into the application package;
   storing, at a terminal, the application package;
   determining, when a request for executing the application is detected, a validity of the application package; and
   executing an application according to the validity of the application package,
   wherein the executing of the application comprises:
   calling, at an operating system, an open function of a subsystem in response to an application execution request;
   ciphering the main binary of the application package using a checker added to the open function in response to the calling of the open function;
   notifying, when the result of the ciphering and the checksum file match with each other, the operating system of the successful validation; and
   permitting, when the validation is success, the application to use the subsystem, the enabler and the checker using the same ciphering key.

5. The method of claim 4, wherein the enabler and the checker cipher a name, file size, and program ID of the main binary.

6. The method of claim 5, wherein the subsystem is one of a driver and a service which the application has requested for use.

7. The method of claim 6, further comprising rejecting, when the validation is failure, the use of the subsystem by the application.

8. An application execution method, the method comprising:
   receiving a request for executing an application included in an application package;
   determining a validity of the application package; and
   executing the application according to the validity of the application package,
   wherein the determining of the validity of the application package comprises:
   calling, at an operating system, an open function of a subsystem in response to an application execution request;
   ciphering a main binary of the application package using a checker added to the open function in response to the calling of the open function; comparing the ciphered value with a checksum file included in the application package and
   a subsystem including a checker, for ciphering the main binary of the application package using the checker added to the open function in response to the call, for notifying, when the result of the ciphering and the checksum file match with each other, the operating system of the successful validation, the enabler and the checker using the same ciphering key.

* * * * *